Oct. 28, 1952          H. E. RANDLETT          2,615,787
PURIFICATION AND SEPARATION OF GASEOUS MIXTURES
Filed Aug. 27, 1949
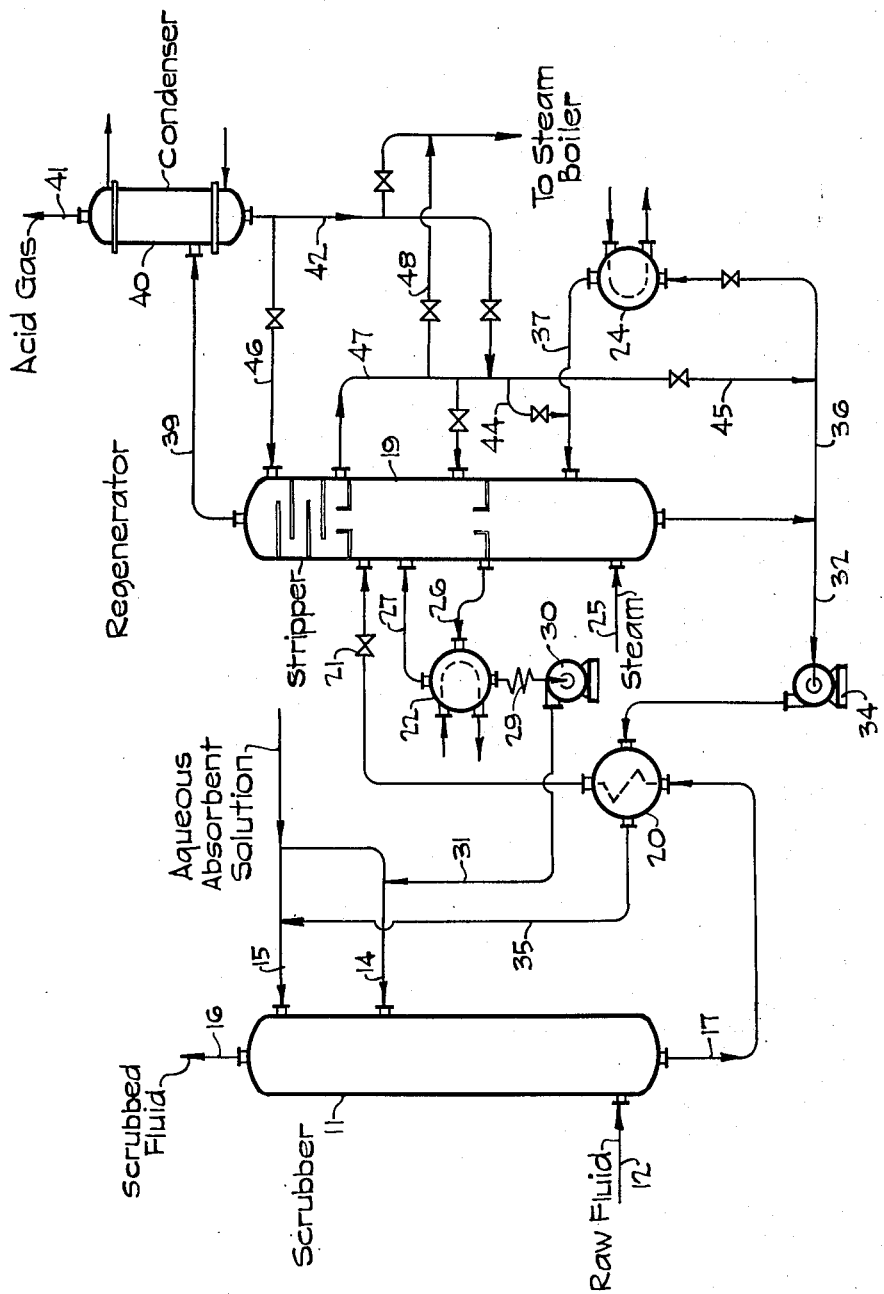
Inventor: Herbert E. Randlett
By his Agent *John H. Colvin*

Patented Oct. 28, 1952

2,615,787

UNITED STATES PATENT OFFICE 2,615,787

PURIFICATION AND SEPARATION OF GASEOUS MIXTURES

Herbert E. Randlett, Oakland, Calif., assignor to Shell Development Company, San Francisco, Calif., a corporation of Delaware Application August 27, 1949, Serial No. 112,823

9 Claims. (Cl. 23—2)

1

This invention relates to the purification of gases and hydrophobe liquids containing vaporizable weakly acidic components such as $H_2S$, $CO_2$, HCN, mercaptans, phenols, etc., and especially deals with the purification of normally gaseous hydrocarbons containing objectionable quantities of $H_2S$ and with the purification of $H_2$- and/or CO-containing synthesis gas containing also objectionable quantities of $CO_2$ and/or $H_2S$.

A number of processes have been proposed and employed for the separation of $H_2S$, and analogous vaporizable weak acids, from gases or hydrophobe liquids, which processes involve the continuous circulation of an alkaline-reacting liquid absorption medium through an absorption stage in which the fluid is scrubbed and $H_2S$ absorbed in the alkaline liquid, and through a reactivation or stripping stage in which the absorbed $H_2S$ is at least partially removed so that the absorption medium is regenerated and rendered suitable for scrubbing of additional amounts of gases or hydrophobe liquids.

Fluids treated by processes of the type described comprise natural gas, petroleum refinery gases, coke oven gas, generator gas and other manufactured gases, as well as the gases generated in the various industries, such as ore smelting; or air containing weakly acidic gases, especially hydrogen sulfide or $CO_2$; or organic liquids which are substantially immiscible with water, as propane, butane, pentane, hexane fraction (or mixtures thereof), benzene, natural gasoline, low boiling gasoline fractions, gasoline distillates, kerosene distillates, normally liquid chlorinated hydrocarbons for instance carbon tetrachloride, ethylene dichloride, etc., fatty and essential oils, and other hydrocarbon and nonhydrocarbon chemically neutral fluids.

For the absorption of the weakly acidic components, aqueous solutions of certain organic hydroxy amino bases or salts of inorganic strong bases and relatively weak acids of low volatility are usually employed. A suitable absorption medium absorbs the weak acid from the fluid quickly and completely and is capable of being regenerated by convection activation, i. e., it permits substantial removal of the acid by simple distillation or by a reversal of the absorption reaction in a simple manner, by passing an inert gas therethrough, preferably at an elevated temperature, as by boiling, steaming, and at a normal or reduced pressure. Among the absorption media capable of regeneration by convections which have been used in the past for re-

2 moving $H_2S$, $CO_2$ and HCN, are aqueous solutions of the following compounds: tri-potassium phosphate, sodium carbonate, sodium phenolate, sodium borate, sodium arsenite, mono-, di- and tri-ethanol amine or mixtures thereof, diaminoisopropanol, etc. Mercaptans are generally removed with aqueous solutions of alkali metal hydroxides.

The term "absorbents," as employed herein, refers to compounds of the above type which are capable of absorbing weak acids and releasing them upon heating and/or under reduced pressure in contact with a vaporous convection medium such as steam, air, nitrogen, hydrogen, hydrocarbon vapors, etc. The terms "fat," "foul" or "spent" solution, as herein used, designate an absorbent solution which contains sufficient weak vaporizable acid so that the solution must be regenerated before it can be used economically for further scrubbing of fluid; and the term "lean" solution indicates a regenerated or fresh solution suitable for further scrubbing.

In general practice, it has been found to be more feasible to regenerate partially a portion of the spent solution and return the resulting lean solution to an intermediate section of the absorber or scrubber, and to regenerate more completely the remainder of the spent solution and to return the resulting very lean solution to the upper section of the absorber, rather than to regenerate all of the spent solution to the same degree (same concentration of acidic material) before returning it to the absorber.

It has also been previously disclosed (U. S. 2,164,194) that, contrary to expectations and assumptions, the partial pressure of $H_2S$ or similar weak acids increases with a rise in the concentration of the absorbent for constant ratios of the weak acid to absorbent in the solution, as long as the absorbent solution forms but a single layer. The significance of this is that a given amount of spent absorbent in a relatively concentrated solution can be stripped to a certain predetermined weak acid content with the expenditure of less work than would be required if the same amount of spent absorbent were in a more dilute solution. In view thereof, it has been proposed to improve the regeneration of spent fat solution by heating the fat absorbent solution to vaporize a portion of the water of solution (thereby increasing the concentration of the absorbent in the solution), thereafter steam-stripping the resultant solution of increased absorbent concentration under conditions substantially to maintain said increased concentration, by not returning water of condensation to the top of the stripper as reflux, whereby a concentrated stripped solution is obtained, withdrawing the stripped solution from the stripping zone, and adding to the concentrated withdrawn solution an amount of water substantially equal to that vaporized, thereby restoring the stripped and regenerated (lean) solution of increased concentration to the normal concentration of the absorbent solution. It has also ben suggested that the added water may be obtained by passing the vaporous products from the stripping zone to a dephlegmator or partial condenser and condensing a portion or all of the water therefrom, which condensate, or a portion thereof, is added directly to the withdrawn regenerated absorbent solution of increased concentration. Such reuse of this water is highly desirable, particularly in those installations which are placed at locations where it is essential to conserve all available water. On the other hand, such condensate necessarily contains an appreciable proportion of hydrogen sulfide, corresponding to the equilibrium concentration of hydrogen sulfide in the water at the temperature at which it is withdrawn from the cooler or dephlegmator. In general, the temperature of the condensate as withdrawn from the dephlegmator would range from about 100° F. to about 200° F., and would contain from about 3400 to 100 p. p. m. by weight, respectively of $H_2S$ and, if $CO_2$ is present, it may range as high as 1000 p. p. m.

It is a purpose of this invention to provide a novel method for improving the absorption and regeneration efficiencies. Another purpose is to facilitate the regeneration so that the work required to reduce the acid gas content of the spent solution upon regeneration to a predetermined point is minimized. Still another object is to simplify the regeneration required to obtain regenerated solution having predetermined desired characteristics. A further object is to provide an improved absorption and regeneration process of the type described which at the same time is both energy conservative and material conservative, i. e. conserves both material and energy.

It has now been found that economies can be effected in an overall regeneration process wherein it is desired to regenerate or restore an aqueous solution of an alkaline absorbent containing $H_2S$ and/or analogous acidic impurities, to a given state of composition and concentration, by a process involving countercurrently contacting the fat or spent absorbent solution in an upright regenerating zone with a stripping medium, such as steam, under conditions to strip the acidic impurities from the solution and also to remove a portion of the solution-water as vapor, whereby an absorbent solution of a greater degree of regeneration and of increased alkaline concentration is produced in the direction of flow of the solution in the regenerating zone, at least partially condensing the vaporous stream exiting the regenerating zone to produce an aqueous condensate containing a minor proportion of the acidic impurities dissolved therein and introducing said condensate into a substantially lower section of said regenerating zone in proportion to yield an absorbent solution withdrawn therefrom having the desired concentration of alkaline material for use in the absorption or scrubbing operation.

In accordance with a preferred embodiment of the invention, the vaporous stream exiting the top of the regenerating zone is immediately used in a substantially adiabatic stripping zone for countercurrently contacting under refluxing conditions a portion of condensate resulting from at least partial condensation, at a point removed from the top of the regenerating zone, of a prior portion of exited vaporous stream therefrom, to produce in the stripping zone a substantially stripped condensate at about the temperature of the vaporous stream exiting the top of the regenerating zone, and then transferring said stripped condensate directly, or after being further heated by any suitable means, into a lower section of the regenerating zone, such as near the bottom thereof. By subjecting said prior condensate to stripping with the heated vaporous stream from the regenerating zone the resulting stripped condensate produced therein has a substantially reduced content of said acidic impurities approaching the equilibrium value at the highest temperature of the exiting vaporous stream. Furthermore, by injecting said stripped condensate into a lower section of the regenerating zone, particularly near the bottom wherein the solution is at a substantially increased concentration and wherefrom the stripping of said acidic impurities is most readily accomplished, the remaining acidic impurities in the solution make-up stripped condensate are more readily reduced and the regenerated solution of adjusted concentration produced thereby is ready for further use as absorbent for acidic impurities.

The invention will be more readily understood from the following description which is made with reference to the accompanying drawing, the single figure of which is a diagrammatic flow sheet representing the scrubbing of a raw fluid containing acidic impurities in a scrubber with an aqueous alkaline absorbent solution and the regeneration of the resulting fat or spent aqueous alkaline solution to remove the acidic impurities therefrom and to reconstitute the absorbent solution for re-use in the absorber or scrubber.

Referring to the drawing, a raw fluid of the type hereinbefore described containing an acidic gas such as $H_2S$ enters a conventional scrubber 11, which may be a packed or bubble-plate column, or other contacting device through line 12, from any suitable source (not shown). The fluid travels in an upward direction through the scrubber countercurrent to two absorbent solution streams, such as aqueous solutions of $K_3PO_4$ or similar absorbent, which are introduced through lines 14 and 15 at points of the scrubber 11 intermediate between top and bottom and near the top, respectively. Scrubbed fluid is withdrawn through top line 16 and fat absorbent solution containing acid gas is withdrawn through bottom line 17.

The fat solution in line 17 is transferred thereby to the top of the regenerating zone of regenerator 19, any suitable pumping means being utilized for the purpose and the solution being heated as desired in heat exchanger 20 and in any other suitable heater or heat exchanger. Normally, the pressure in the scrubber is sufficient for the solution to flow to regenerator 19 without being pumped, valve 21 in line 17 being utilized for controlling the flow. The regenerating zone of regenerator 19 may be a packed or bubble column or one or a series of shell stills. If the fat solution in line 17 is heated sufficiently and/or the pressure reduction in going into the regenerating zone is lowered sufficiently, a portion of the water of solution together with a substantial portion of the absorbed weak acid is flashed off at once, and as the solution flows downward through the regenerating zone it may be further concentrated and regenerated by heat from the reboilers 22 and 24, through which portions of the solution are circulated. If desired, the reboilers may be placed within the column. Live steam or other stripping gas or vapor may be introduced through line 25.

It is generally preferable to withdraw a portion of the partially regenerated solution, which may be termed a lean solution, from an intermediate point in the regenerating zone, as by line 26, partially vaporize the withdrawn solution as by indirect heating in a heat exchanger or reboiler 22, with return of the resulting vapors to the regenerating zone, as by line 27, and subsequent cooling of the remaining withdrawn solution as by cooler 29 followed by its return to the immediate point of the scrubber 11, as by means of pump 30 and line 31. The remainder of the solution, which may be termed a very lean solution, is withdrawn from the bottom of the regenerating zone and returned by means of line 32, pump 34, heat exchanger 20, any other desired cooling means, and line 35 to line 15 and the top of the scrubber 11. A portion of the bottoms solution may be recirculated through line 36, reboiler or heat exchanger 24 and line 37, back to the regenerating zone.

Water vapors, acid gas and possibly other vapors, are removed from the top of the regenerating zone through a stripping section forming the upper section of the regenerator 19, through a vapor line 39, and into a partial condenser or cooler 40, where adequate cooling of the vapors is effected so as to condense the water therefrom, the uncondensed acid gas leaving the condenser through line 41. When it is desired to conserve water in the process, the condenser 40 is operated so as to condense substantially all of the water in the vapor stream, if necessary a portion of the condensate being further cooled in a subsequent cooler and recirculated to condenser 40 as reflux. By appropriate operation of condenser 40, it is possible to withdraw therefrom an aqueous condensate containing no more of the acidic impurities than the equilibrium value at the temperature of the withdrawn condensate.

In one embodiment of the practice of the present invention the temperature of the condensate withdrawn from condenser 40 will be maintained as high as possible so as to ensure as low a concentration of said acidic impurities as is feasible. In this embodiment a portion of said condensate is delivered by lines 42, 44 and 37 and/or by lines 42, 45, 36 and 37 to the lower section of the regenerating zone of regenerator 19, in an amount required to yield, upon addition to the solution in the bottom of the regenerator, a regenerated solution of the desired concentration. Although the condensate may be injected directly into the regenerator, as indicated, it is preferable to heat it first by passage through the reboiler and to inject it into the regenerator more or less in the form of live steam.

In a preferred embodiment of the invention, at least a portion of the condensate from condenser 40, which condensate in general will be at a temperature which is not above about 180° F. and in most cases will be at a substantially lower temperature, even down to about 100° F., and is returned by line 46 to the top of the stripping section of the regenerator 19 wherein it is substantially stripped, in countercurrent contacting with the vapor stream from the top of the regenerating section, of its content of acidic impurities, the temperature of the remaining liquid collecting in the bottom of said stripping section being substantially that of the existing vapor stream from the regenerating section, that is about 210–220° F. All of this hot, substantially stripped, condensate is withdrawn from said stripping section by means of a line 47, without permitting any of it to flow directly into the top of the regenerating zone and downward therein. This stripped condensate is then delivered by means of outside line 47, either entirely or in part to a substantially lower section of the regenerating zone, preferably near the bottom thereof as by means of lines 44 and 37. A portion may be delivered in the liquid phase through line 44 to admixture with reboiled solution in line 37. A portion of the stripped condensate may be delivered by means of line 48 to a suitable steam boiler from which steam may be withdrawn for injection into the regenerator through line 25. In any case, sufficient stripped condensate is delivered into the lower part of the regenerator to function as make-up for the concentrated very lean solution therein to produce a regenerated solution of the desired or proper concentration of alkaline material. The acidic impurity content of the so added make-up condensate is substantially and readily stripped from the resulting concentrated solution and the withdrawn regenerated solution is ready for recirculation to the scrubber, after proper cooling.

While in the foregoing there has been described a preferred simplified arrangement of equipment it shall be understood that known equivalents may be used instead, and that additional heat exchangers, coolers, valves, by-pass lines and other equipment may be incorporated at one or several points, to enable exercise of greatest heat and materials economy and the control of the most favorable temperatures. The installation of such devices is considered to be within the skill of the ordinary plant designer acquainted with their operation. For instance, if vaporizable acids boil near or above the boiling temperature of water, as in the case of mercaptans, a settler may be used to separate liquid mercaptans from the condensed water.

The advantages which result from the mode of operation of the present invention as compared with conventional types of stripping are well illustrated in the following examples, results of which are tablulated in Table I.

A raw hydrocarbon gas containing 2% $H_2S$ was scrubbed at 100° F. at a pressure of 15 atm. with an aqueous tripotassium phosphate solution containing 2.0 mols $K_3PO_4$ per kg. solution. The fat solution was stripped in a 16-plate stripper, 12 plates of which served for solution regeneration while the remaining four plates, which were located immediately above, served for stripping the condensate. In the conventional type of operation the water of condensation, cooled to 100° F. to minimize loss of water with the acidic gases and containing a substantial quantity of $H_2S$, was returned directly to the reboiler; and in the preferred method this condensate was returned to the aforementioned condensate stripping section of the stripper, wherein substantial recovery of heat energy from the vapor stream from the top of regenerating section was accomplished while concomitantly reducing the amount of $H_2S$ in the condensate prior to its withdrawal. The following data are representative of this operation:

Table I.—Stripping operation

[Basis.—1,000 lb. total treating solution containing 2.0 mols K₃PO₄/kg. solution.]

Hydrogen sulfide content, lb.:
  Fat solution_____ 66.84
  Lean solution_____ 41.89
  Very lean solution_____ 6.05
Net H₂S stripped, lb_____ 18.90

|  | Without Condensate Stripping | With Condensate Stripping |
|---|---|---|
| Condensate: | | |
|   Amount, lb_____ | 212.9 | 190.3 |
|   Temperature, ° F_____ | 130 | 220 |
|   H₂S Concentration, p. p. m.____ | 2,330 | 165 |
|   Amount H₂S, lb_____ | 0.50 | 0.03 |
| Water loss to overhead, lb_____ | 1.3 | 1.3 |
| Gross H₂S load, lb_____ | 19.40 | 18.93 |
| Stripping steam load: | | |
|   H₂S Stripping, lb./lb. H₂S_____ | 11.04 | 10.12 |
| H₂S Stripping, lb_____ | 214.2 | 191.6 |
| Sensible Heat, lb_____ | 26.5 | 5.6 |
| Total_____ | 240.7 | 197.2 |

It is evident from these data that a substantial saving in steam is effected by this improved method of carrying out the stripping operation.

I claim as my invention:

1. In the process of purifying a water-immiscible fluid of H₂S and analogous acidic impurities wherein a portion of the fluid containing H₂S and analogous impurities is scrubbed with an aqueous solution of an alkaline absorbent for the acidic impurities and capable of activation by contact with a stripping medium, to produce a fat solution containing said impurities, the fat solution is regenerated for reuse as a scrubbing solution by contacting it with a stripping medium in an upright regeneration zone under conditions to strip the acidic impurities from the solution and to remove with said impurities a portion of the solution-water as vapor, whereby a lean absorbent solution of increased alkaline concentration is produced in the direction of flow of the solution in the regeneration zone and a vaporous stream comprising impurities and a portion of the solution-water is withdrawn from the regeneration zone, the withdrawn vaporous stream is partially condensed to yield a liquid aqueous phase condensate, the stripped lean absorbent solution of increased alkaline concentration is admixed with at least a portion of the condensate produced by the partial condensation of said withdrawn vaporous stream in proportions to restore the absorbent solution to its alkaline concentration when previously used as absorbent scrubbing solution and the regenerated and reconstituted absorbent solution is utilized as scrubbing solution for the removal of impurities from a further portion of the fluid containing impurities, the improvement which comprises adding the portion of the condensate, produced by the partial condensation of the withdrawn vaporous stream, to the absorbent solution of increased alkaline concentration to restore it to the desired and initial concentration thereof while said solution is in a low section of the regenerating zone and therein stripping from the resulting solution a substantial proportion of the acidic impurities contained in said condensate.

2. The improvement in the process according to claim 1, wherein the aqueous solution of an alkaline absorbent for the acidic impurities is an aqueous potassium phosphate absorbent solution.

3. The improvement in the process according to claim 1, wherein the partial condensation of the vaporous stream from the regeneration zone is effected at substantially the temperature of the exiting vaporous stream from the regenerating zone.

4. The improvement in the process according to claim 1, wherein the aqueous solution of an alkaline absorbent for the acidic impurities is an aqueous potassium phosphate absorbent solution and wherein the partial condensation of the vaporous stream from the regeneration zone is effected at substantially the temperature of the exiting vaporous stream from the regenerating zone.

5. In the process of purifying a hydrocarbon fluid containing H₂S and analogous impurities wherein a partially purified portion of the hydrocarbon fluid containing impurities is scrubbed with a very lean aqueous alkaline solution, the resulting partially spent aqueous solution is combined with a lean aqueous alkaline solution and the resulting solution is used to scrub a portion of the impurities from another portion of the hydrocarbon fluid containing impurities, to produce a spent alkaline solution containing impurities, the spent solution is regenerated to produce the foregoing mentioned very lean and lean aqueous alkaline solutions by contacting it with stripping steam in an upright regeneration zone under conditions to strip the acidic impurities from the solution and to remove with said impurities a portion of the solution-water as vapor, whereby an increasingly lean absorbent solution of increasingly higher alkaline concentration is produced in the direction of flow of the solution in the regeneration zone and a vaporous stream comprising impurities and a portion of the solution-water is withdrawn from the regeneration zone, a portion of the regenerated solution is withdrawn from an intermediate section of the regeneration zone as lean solution and reused as lean scrubbing solution in accordance with foregoing description thereof, the withdrawn vaporous stream is partially condensed to yield a liquid aqueous phase condensate, the remainder of the regenerated solution representing very lean solution is admixed with at least a portion of the condensate produced by the partial condensation of said withdrawn vaporous stream in proportions to restore the very lean solution to its alkaline concentration when previously used as very lean scrubbing solution and the thus reconstituted very lean solution is utilized as very lean scrubbing solution for a further portion of partially purified hydrocarbon fluid in accordance with foregoing description thereof, the improvement which comprises adding the portion of the condensate, to the very lean solution of increased alkaline concentration to restore it to the desired and initial concentration thereof while said solution is in a low section of the regenerating zone and therein stripping from the resulting solution a substantial proportion of the acidic impurities contained in said condensate.

6. The improvement in the process according to claim 5, wherein the aqueous alkaline solution is an aqueous potassium phosphate absorbent solution.

7. The improvement in the process according to claim 5, wherein the partial condensation of the vaporous stream from the regeneration zone is effected at substantially the temperature of the exiting vaporous stream from the regenerating zone.

8. The improvement in the process according to claim 5, wherein the aqueous alkaline solution is an aqueous potassium phosphate absorbent solution and wherein the partial condensation of the vaporous stream from the regeneration zone is effected at substantially the temperature of the exiting vaporous stream from the regenerating zone.

9. The improvement in the process according to claim 5, wherein the aqueous alkaline solution is an aqueous potassium phosphate absorbent solution and wherein the partial condensation of the vaporous stream from the regeneration zone is effected at substantially the temperature of the exiting vaporous stream from the regenerating zone by countercurrently contacting said exiting vaporous stream in a stripping zone, in superposed and immediate vapor and liquid phase communication with the exit from the regenerating zone, with a partial condensate of resulting vapor stream exiting said stripping zone.

HERBERT E. RANDLETT.

REFERENCES CITED

The following references are of record in the file of this patent:

UNITED STATES PATENTS

| Number | Name | Date |
| --- | --- | --- |
| 1,945,163 | Rosenstein et al. | Jan. 30, 1934 |
| 2,157,879 | Zublin | May 9, 1939 |
| 2,219,713 | Schreiber | Oct. 24, 1940 |
| 2,368,600 | Rosenstein | Jan. 30, 1945 |